May 25, 1926.

M. A. LAWTON

FLOW CUT-OFF PIPE FITTING

Filed Feb. 5, 1925

1,585,726

Inventor.
Mark A. Lawton
by Heard Smith & Tennant
Attys.

Patented May 25, 1926.

1,585,726

UNITED STATES PATENT OFFICE.

MARK A. LAWTON, OF NEWTON, MASSACHUSETTS.

FLOW-CUT-OFF PIPE FITTING.

Application filed February 5, 1925. Serial No. 6,934.

This invention relates to a pipe fitting designed to cut off the flow of liquid through a pipe in such a manner that a measured quantity will be discharged from the pipe when the flow into the fitting is cut off. Such a fitting is particularly useful in connection with gasoline pumping stations where it is necessary to measure the liquid furnished with accuracy.

The object of the invention is to provide a simple and efficient fitting for this and similar purposes which may be economically manufactured and which shall not be likely to get out of order.

The nature and objects of the invention will appear more fully from the accompanying description and drawings and will be particularly pointed out in the claims.

Figure 1:
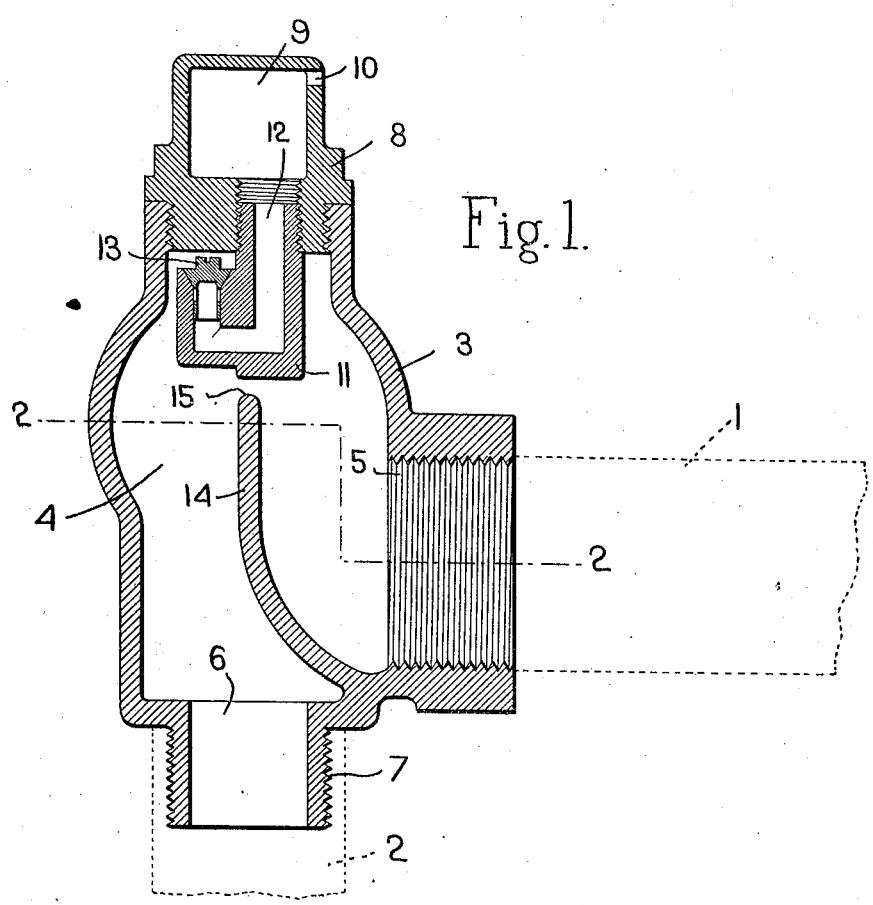
Fig. 1 illustrates a fitting embodying a preferred form of the invention shown in vertical cross section with suitable pipe connections indicated in dotted lines.
Figure 2:
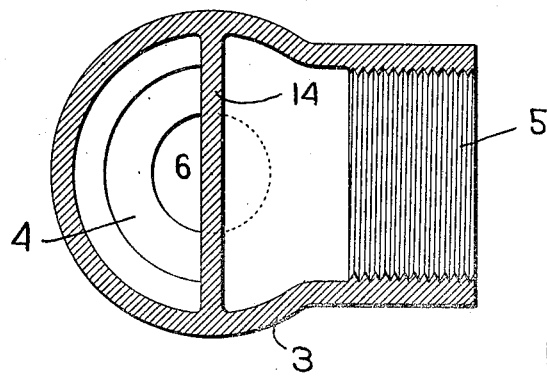
Fig. 2 is a view in cross section taken on the line 2—2 of Fig. 1.

The pipe fitting of this invention, as already noted, is particularly useful in connection with gasoline pumping stations wherein a horizontal pipe indicated at 1 in dotted lines extends from the pump and wherein a flexible hose indicated at 2 in dotted lines is used to discharge the gasoline into the tank of the vehicle. Unless a shut-off valve is employed at the very end of the hose, it is necessary that the amount of gasoline contained in the hose and pipe connections and discharged into the tank of the purchaser after the flow is shut off shall be measured with accuracy. The present fitting secures this by insuring that when the flow is shut off all the fluid up to an exact point in the line of connections shall be discharged through the hose.

This fitting is preferably formed of a metal, such as brass, casting. The main portion of the fitting comprises a casing 3 of suitable shape to enclose a chamber 4. An inlet opening is formed in the wall of the casing, and preferably in the side wall, so as to connect directly with the pipe line such as 1. This inlet opening is shown at 5 as interiorly threaded to receive the threaded end of the pipe 1. An outlet opening is formed in the wall of the casing to provide for the discharge of the fluid. This outlet opening is preferably formed in the bottom of the casing at 6 and is shown as extending through an exteriorly threaded boss 7 on to which the discharge hose 2 is connected.

The casing at the top is provided with an opening to the atmosphere in which a vacuum relief valve is located, so that when the flow of liquid into the casing is shut off and a vacuum tends to form in the top of the chamber, this relief valve will open and prevent any liquid being siphoned through the fitting. This vacuum relief valve and mounting in its specific construction forms no part of the present invention. In the construction illustrated a hollow cap 8 is threaded into a large threaded opening in the top of the casing. The chamber 9 in this cap opens to the atmosphere through a hole 10. An elbow-shaped pipe 11 is threaded into the bottom of the cap 8 and provides a channel 12 from the chamber 9 into the chamber 4. The end of this channel is located near the top of the chamber 4 and in this end is fitted a relief valve 13.

The important feature of the fitting is the baffle wall 14. This baffle wall, which is preferably formed of a part of the casting of which the casing is made, extends across the chamber 4 between the inlet opening 5 and the outlet opening 6 and its top or upper edge 15 is located well above the top of the inlet opening 5. This baffle wall extends mainly in a vertical direction and divides the chamber 4 into two compartments.

The operation will now be apparent. When the fluid, such as gasoline, is flowing into the inlet opening 5, it fills the chamber 4 and passes out through the outlet opening 6. So long as the flow continues, the chamber 4 is filled and the relief valve 13 is held seated by the pressure. When, however, the flow is shut off as at the pump, or at a point outside of the outlet opening 5, the continuance of the flow through the outlet opening 6 at once produces a vacuum in the top of the chamber 4, the relief valve 13 rises and air enters, breaking the vacuum. The liquid at the outlet side of the baffle wall 14 immediately drains off, leaving the chamber 4 at the inlet side of the baffle 14 full of liquid up to the level of the top of the baffle wall. Thus a definite and measured amount of liquid is discharged whenever the flow is shut off outside of the fitting and this definite and measured amount is determined by the top of the baffle wall 15.

Having thus described the invention, what is claimed as new, and desired to be secured by Letters Patent, is:

1. A flow cut-off pipe fitting comprising a casing enclosing a chamber with inlet and outlet openings in the casing to and from the chamber and with an opening from the top of the chamber to the atmosphere, a baffle wall extending across the chamber between said inlet and outlet openings, dividing the chamber into two compartments and having its upper edge above the top of the inlet opening, and a vacuum relief valve in the opening from the top of the chamber whereby, when the flow of liquid into the casing is shut off outside the inlet opening, the liquid on the outlet side of the baffle wall will drain off and leave the chamber on the inlet side of the baffle wall full of liquid up to the level of the top of the baffle wall.

2. A flow cut-off pipe fitting comprising a casing enclosing a chamber with an inlet opening in one side of the casing into the chamber adapted to be connected to a horizontal pipe and an outlet opening in the bottom of the casing into the chamber adapted to be connected to a discharge pipe and with an opening from the top of the chamber to the atmosphere, a vertical baffle wall within said casing extending across the chamber between said inlet and outlet openings, dividing the chamber into two compartments, and having its upper edge above the top of the inlet opening, and a vacuum relief valve in the opening from the top of the chamber, whereby, when the flow of liquid into the casing is shut off outside the inlet opening, the liquid on the outlet side of the baffle wall will drain off and leave the chamber on the inlet side full of liquid up to the level of the top of the baffle wall.

In testimony whereof, I have signed my name to this specification.

MARK A. LAWTON.